Oct. 29, 1968  C. J. WELCKER ET AL  3,407,435
SHRIMP AND SARDINE PROCESSING MACHINE
Filed March 23, 1966  3 Sheets-Sheet 3
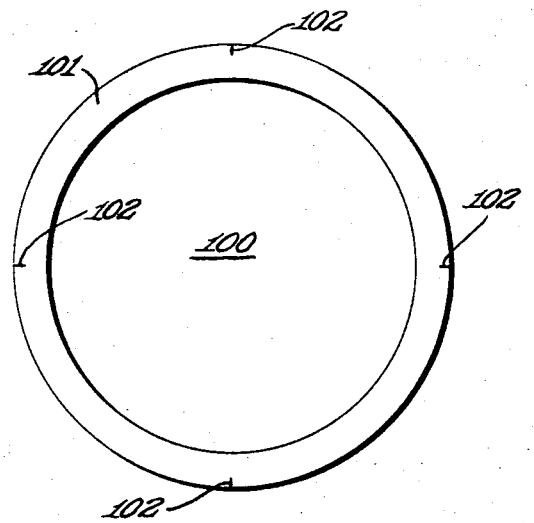
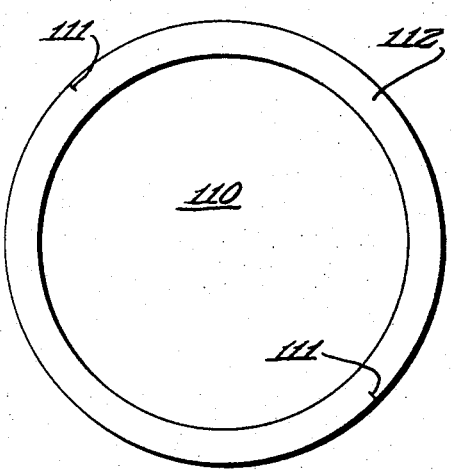
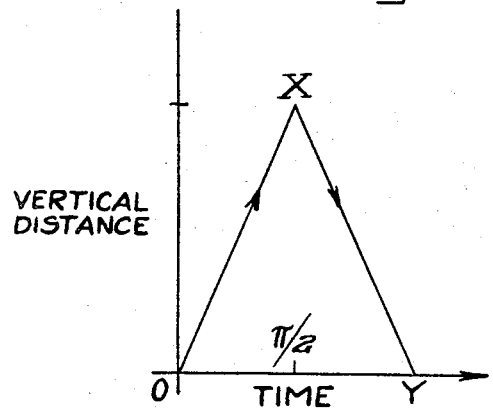
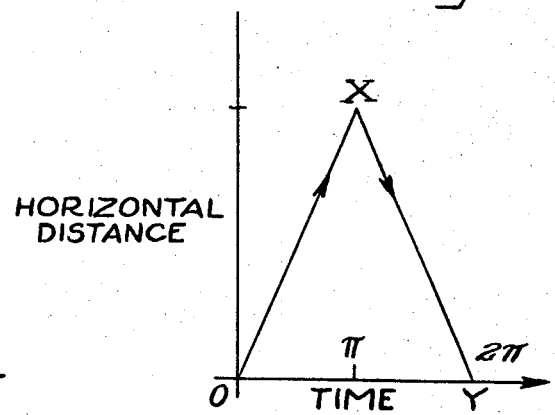
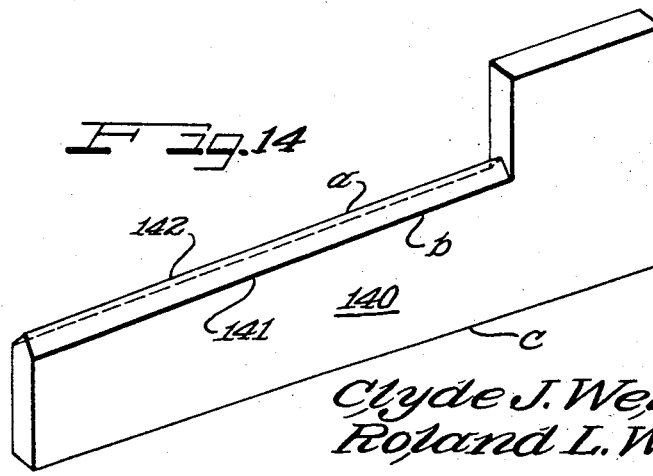
INVENTORS
Clyde J. Welcker
Roland L. Welcker
ATTORNEYS

United States Patent Office 3,407,435
Patented Oct. 29, 1968

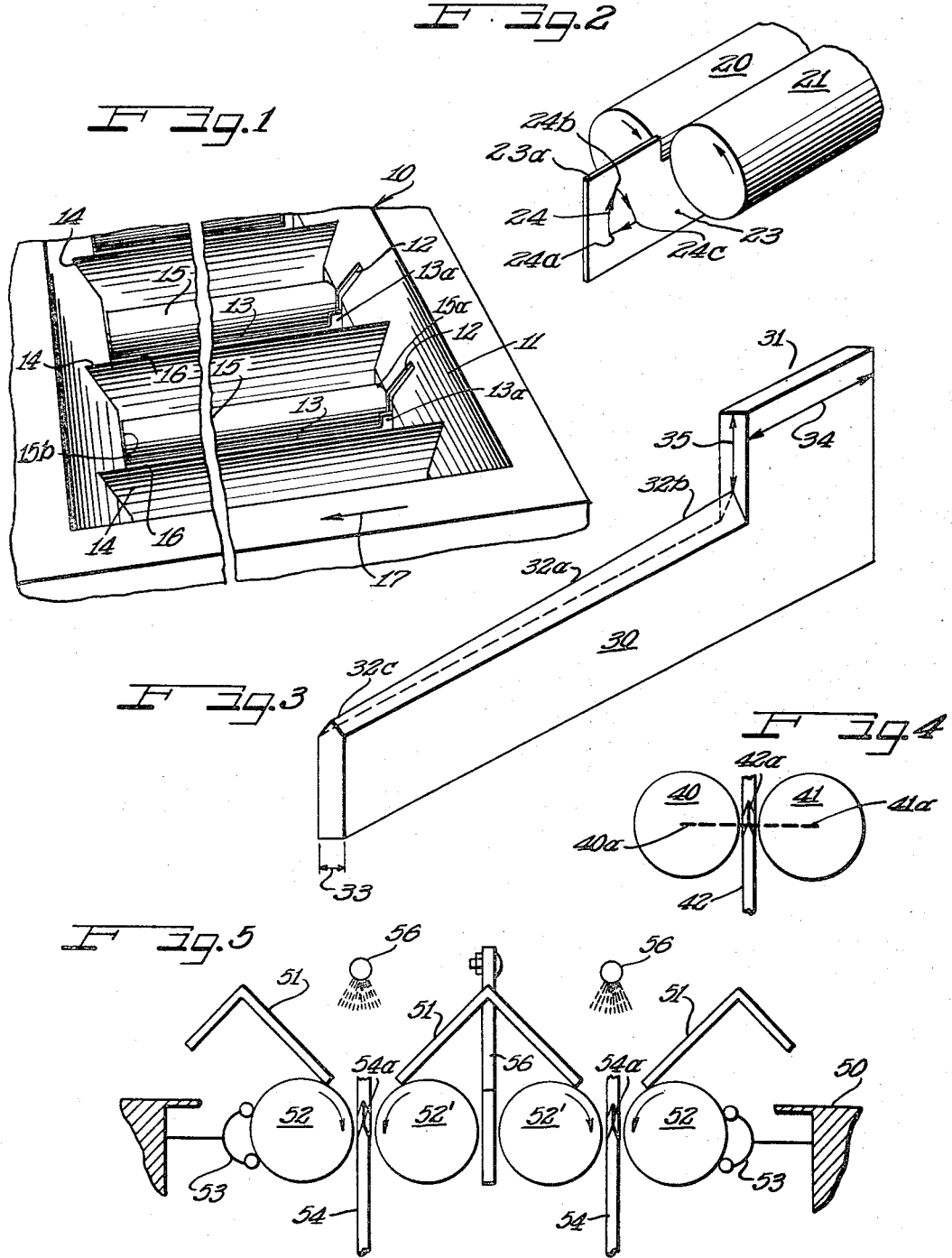

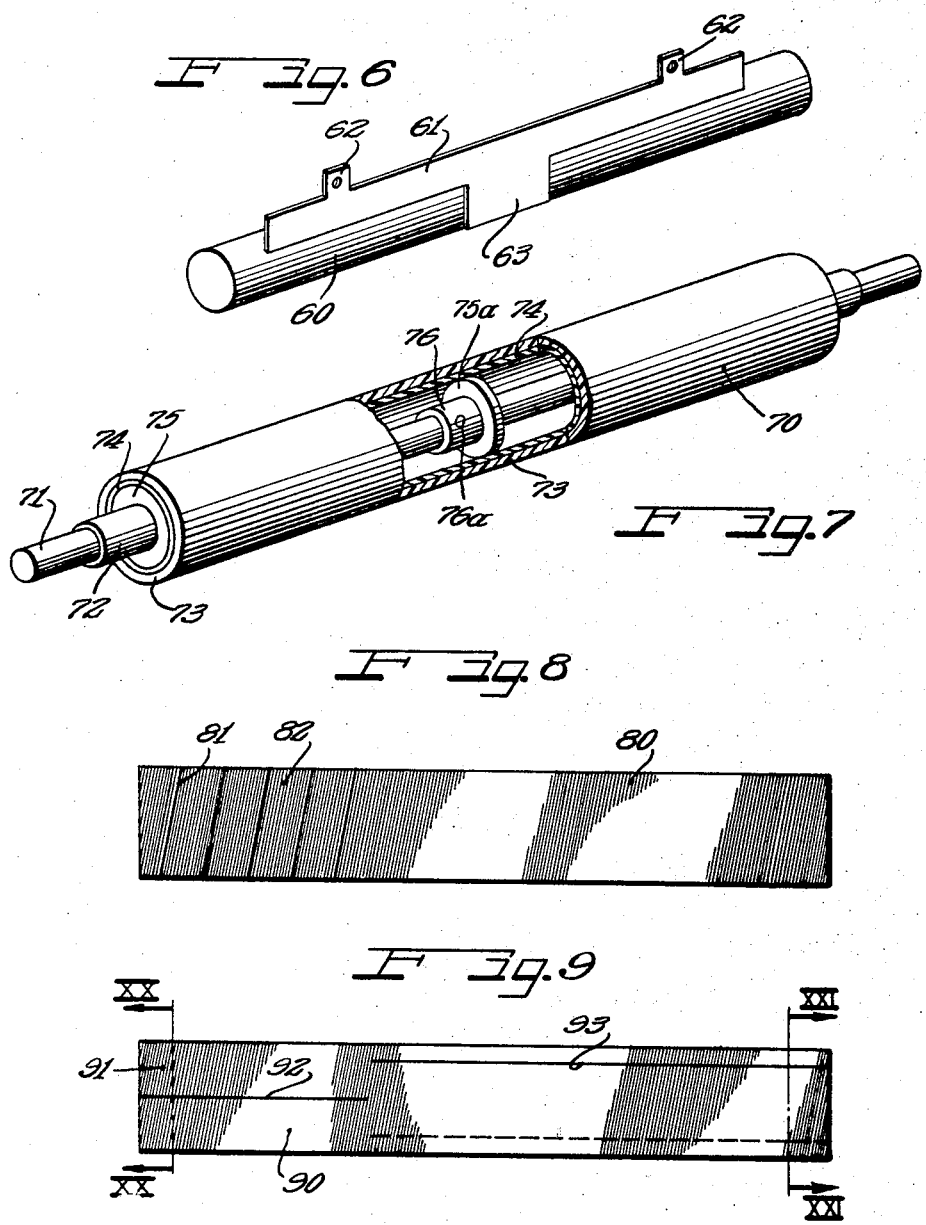

3,407,435
SHRIMP AND SARDINE PROCESSING MACHINE
Clyde J. Welcker and Roland L. Welcker, both of 1334-36
St. Bernard Ave., New Orleans, La. 70116
Filed Mar. 23, 1966, Ser. No. 536,690
24 Claims. (Cl. 17—2)

ABSTRACT OF THE DISCLOSURE

A shrimp and like marine life cleansing method and apparatus utilizing at least a pair of horizontal rollers having locally resilient frictional surfaces spaced apart a distance to accommodate a sharp-edged center plate, the sides of which define a processing channel with each of the individual rollers and having attached to one end thereof an upwardly extending appendage. The center plate and attached appendage is driven through a vertically undulating cycle so that raw shrimp and the like are peeled, de-headed, de-veined and otherwise cleansed by the working cooperation of the machine components to yield fully cleansed, substantially unmultilated meats.

---

The present invention relates generally to an improved machine and method for processing shrimp, sardines and like marine life wherein the outer covering of the marine life is removed and inedible matter is massaged out of the marine life.

In our Patent Nos. 3,080,605; 3,143,761 and 3,143,763, all of which patents are incorporated herein by reference, we have disclosed and claimed a shrimp processing method and machine which generally includes a pair of horizontal parallel side members having inclined or sloping surfaces extending downwardly toward each other provided by members such as parallel plates or parallel rollers with a space between them. Mounted in the space between the parallel members is a vertical plate having flat planar side surfaces facing each of the parallel members with each vertical side surface and the upper surface of each parallel member providing first and second opposing surfaces which engage the shell of the shrimp and remove it therefrom. The parallel members are preferably rollers which rotate inwardly toward the plate and the plate is provided with a unique undulating (or tilted D shaped) motion in a vertical plane wherein the plate moves up and down in an arcuate path and it returns horizontally to its starting point. The horizontal movement is at a loaction recessed between the rollers so that the shrimp are, at that point, engaged by both rollers. These movements clean the shrimp and draw the trash downwardly while simultaneously moving the shrimp horizontally along the rollers.

The present invention contemplates improvements in such type of machines and methods whereby shrimp, sardines and like marine life are peeled, squeezed and massaged to present fully cleaned edible meats.

Accordingly, it is an object of the present invention to provide an improved shrimp, sardine and the like marine life cleaning machine and method which is capable of performing in one process, an improved shrimp, sardine and like marine life cleaning operation at modern day commercial rates of speed.

A further object of the present invention is to provide an improved mechanical marine life cleansing machine having simplified movements for ease of operation and wherein the marine life will be automatically divested of its outer covering and inedible matter, such as entrails, sand, grit, etc. which is automatically massaged out of the marine life, presenting fully cleaned, ready to eat marine foodstuff.

A still further object of the present invention is to provide a machine capable of processing marine life carcasses into fully cleaned, ready to eat marine foodstuff by frictional pinching, squeezing and massaging action accomplishing the cleansing and transporting the marine life and which machine is relatively simple and inexpensive to manufacture, operate and maintain.

A yet further object of the present invention is to provide a machine capable of handling all sizes of shrimp, sea prawn, crayfish and including sardines and other like marine life without the necessity of independently sorting and grading the marine life into various size groups, thus allowing greater economic operational advantages.

A feature of the machine and method is its utilization of the inherent physical characteristics of the shrimp, sardines and like marine bodies and their outer coverings to the advantage of the cleansing process in order to effect a more complete and uniform removal of the inedible and objectionable portions of the marine life. It has been noted that in the process of hand cleaning shrimp, sardines and like marine life, the fingers manually employ a pinching, pulling, sliding, unraveling and massaging action. In the intsant invention the desirable manual operations of cleaning shrimp, sardines and like marine life are utilized and substantially duplicated with the exploitation of friction forces, and the friction forces and their reactions are utilized in beheading, peeling, removing exterior appendages, removing entrails, sand, grit and generally finish processing, where appropriate, the shrimp, sardines and like marine life. It is to be noted that marine life, such as shrimp or sardines, is generally a heterogeneous structure including a body, a neck, a midsection and end section, and having an outer covering which is substantially different from the meat portion and with appendages, feelers, pinchers, legs, veins, entrails and the like. The various appendages normally attached in one way or another to the body possess certain elastomeric properties of flexibility but lack high synergistic response resiliency and/or are not securely attached to the body. Their cross-sections are small as compared with the other parts of the marine life under consideration and all these factors are taken advantage of by being easily engaged and removed by the machine components. The outer covering, such as a shell, is of a relatively "dense" material, stuff in comparison to the other parts and possesses limited elastomeric properties of flexibility with some synergistic response. The degree of resiliency is relatively slight and the elastic modulus is quite low and it does not take too much force to overcome this resiliency. The outer covering, such as a shell or skin, is also generally attached to the body by relatively flimsy tissue which is easily ruptured. The head shell is only slightly resilient due to its shape and composition, and the application of force easily flattens it. The inner soft mushy components add little or nothing to the resiliency of the shell structure and once flattened they remain squashed. The body meat differs markedly from the preceding components in that it has inherent inner elastomeric properties, and in addition to flexibility, has inherent synergistic response to deformation and a higher elastic modulus making it more elastic. The surface of the body meat is smooth and moist and the addition of water tends to reduce the coefficient of friction of the body meat surface with the machine surface and increase the natural differences and values of coefficient of the smooth meat and outer covering. The outer covering also hase a degree of roughness, nicks, barbs, sharp edges, and the like. In the application of frictional forces in the processing of marine life the stresses produce strains including tension in the outer covering anchoring points to cause parting, tension on neck gristles to cause separation, shear in inner face of the outer covering and body meat to cause loosening, shear in sliding the loosened outer covering from the body meat, compression of the head to cause squashing and compressing of the appendages, including the feelers, legs, tail flippers and so forth, and compression of the outer covering and appendages to force them into a space but at the same time not accommodating the body meat.

Other objects, advantages and features will become more apparent with the teaching of the principles of the present invention in connection with the disclosure of the preferred embodiments thereof in the specification, claims and drawings, in which:

FIGURE 1 is a partial top perspective view with parts broken away and the cover removed to better illustrate the continuous channel formed between the receiving chutes, processing rollers and center plate;

FIGURE 2 is a diagrammatic view shown in perspective illustrating the motions and relative positions of the operative parts which directly engage the marine life;

FIGURE 3 is a detailed fragmental perspective view of a portion of the upwardly extending planar member having a top portion with a decreasing slope extending in one direction and having an appendage attached to one end thereof;

FIGURE 4 is an end diagrammatical view of one set of rollers of the cleaning machine showing the relative position of the upwardly extending plate to the center of the roll at the end of its downward movement;

FIGURE 5 is an end elevational view of the rollers of the cleaning machine with the back-up members, shown in somewhat schematic form;

FIGURE 6 is a detailed perspective view of one embodiment of the back-up members, shown relative to one of the rollers;

FIGURE 7 is an overall perspective view, with parts broken away, of the preferred embodiments of a processing roller;

FIGURES 8 and 9 are diagrammatic showings of the preferred forms of frictional surfaces provided on the processing rollers;

FIGURE 10 is a diagrammatic end view taken substantially along the line X—X of FIGURE 9 showing one end of the frictional surface there depicted;

FIGURE 11 is a diagrammatic view taken substantially along the line XI—XI of FIGURE 9 showing the other end of the frictional surfaces there illustrated;

FIGURES 12 and 13 are graphs plotting vertical and horizontal movement, respectively, of the center plate versus time to illustrate the preferred cycle of the upwardly extending center plate;

FIGURE 14 is another perspective view of the upwardly extending planar member, similar to FIGURE 3, but showing a somewhat simplified construction.

As shown on the drawings:

As shown in FIGURE 1, a shrimp, sardine and like marine life processing machine, hereinafter referred to as a processing machine, generally indicated at 10, has a receiving chute 11 supported by a suitable rigid frame (not shown). The receiving chute 11 extends in a downward incoming angle to a cross-machine plane (generally indicated at arrow 17) and extends generally to a plane parallel with the upper peripheral surface portion of processing rollers 15 and 16. Receiving chute 11 thereafter continues in a direction generally perpendicular to the receiving ends 15a of the processing rollers 15 and 16 and is in close running relationship with the peripheral end portions of the processing rollers 15 and 16 so as to form a continuous channel with the rolls for conveying the marine life therethrough. Receiving chute 11 is provided with an aperture 12 in alignment to receive an appendage 13a which is connected to an upwardly extending member 13.

Sloping shields, or guide members 14 are provided to direct the marine life being processed into the nips formed by each set of processing rollers 15 and 16. Guide members 14 are integrated with and suitably fastened to the receiving chute 11, providing a generally continuous surface area therewith. Each of the guide members 14 has the general shape of an inverted V with one side of the guide member feeding marine life into the nip between one set of processing rollers and the other side of the guide member feeding into the nip between an adjacent set of processing rollers.

Processing rollers 15 and 16 are mounted for rotation by conventional means (not shown) and have a suitable power supply means (not shown, but more fully illustrated in our aforesaid patents) rotating processing rollers 15 and 16 relative to one another. A set of processing rollers consists of two generally parallel horizontal rollers having a receiving end 15a and a discharge end 15b (roller 16 has similar end portions which are not shown), spaced apart a predetermined distance to form a nip. The processing rollers terminate at the discharge ends 15b which are a short distance away from the rear portion of the machine so that the marine life falls from the continuous channel formed by the rollers and center plate, down between the shafts of the rollers to a suitable receiver (not shown). More than one set of processing rollers 15 and 16 may be provided, depending primarily on the volume of marine life to be processed. As shown in FIGURE 1, there is provided at least two sets of processing rollers 15 and 16, however, this is but a partial view and it has been found that a machine with eleven sets of processing rollers generally provides sufficient capacity for most standard marine life processing and cleansing operations. A more detailed discussion of the processing rollers will be found hereinafter in conjunction with FIGURES 7 through 11.

Upwardly extending member or central plate 13 extends generally parallel with the rotational axes of the processing rollers 15 and 16 and is positioned in the general center of the nip formed by the processing rollers. Of course, one center plate 13 is provided for each set of processing rollers. The center plate 13 is connected to a power supply means (not shown, but more fully illustrated in our aforesaid patents) moving the center plate in an undulating cycle whereby the marine life is squeezed and peeled against the processing rollers 15 and 16 and the marine life is massaged by the substantially simultaneous action of the processing rollers 15 and 16 and the center plate 13 and is forwardly propelled in the processing channel formed by the processing rollers and other operational elements. The center plate 13 is provided with an appendage 13a which may be a separate element attached to the center plate 13 by conventional means, or it may be formed as an integral part of center plate 13. The appendage 13a extends into the receiving chute 11 through aperture 12 and forms a closure therewith throughout the cycle imparted to the central plate 13 by its power supply. Appendage 13a acts as an impeller for the marine life on the receiving chute 11 and in the nip, especially that marine life which is in close proximity to the receiving ends of the processing rollers. Appendage 13a pushes the marine life down the processing channel, as indicated generally by arrow 17 toward the discharge end of the machine.

FIGURE 2 shows a set of processing rollers 20 and 21 rotating toward each other, as indicated by the arrows and in general nip forming relationship. A center plate 23 is provided in the substantial center of the nip and has attached to it, an appendage 23a. The center plate 23 is moved in a unique oscillating vertical motion that is undulating in nature as shown by the arrow line 24, which defines generally a triangular-like shape, or a D tilted about 90°.

Assuming point 24a to be a starting point, center plate 23 moves upwardly in an arcuate path to point 24b. The center plate 23 is next continuously moved downwardly in an arcuate path from point 24b to point 24c. The center plate is then moved in a horizontal path from point 24c to point 24a. In other words, the center plate is moved in an undulating motion in a vertical plane and between each of the undulations is moved horizontally back to its starting point. The undulating path of travel transports the marine life along the channels formed by the processing rollers, as well as coacting with the side surfaces of the rollers and the center plate for cleaning the marine life. While the foregoing recites the preferred motion of the center plate, an alternative cycle for the plate could be a generally rectangular motion including movements straight upward, straight horizontal, straight downward, followed by a horizontal turn to the starting point.

FIGURE 3 shows a detailed view of a center plate 30 having appendage 31 attached thereto. While various non-toxic and non-corrosive materials may be used for center plate 30, a preferred construction requires that the center plate and appendage be made of aluminum, however, certain rigid plastics having the requisite characteristics may also be used. The center plate 30 is generally linearly co-extensive with the processing rollers and has a height sufficient to allow its top portion 32a to be generally equal to, or slightly above the plane containing the centers of the processing rollers at the start of its undulating cycle. In other words, when center plate 30 is at point 24a (of FIGURE 2), its top edge 32a is at least touching the plane connecting the center points of the processing rollers. This can be best visualized at FIGURE 4 wherein processing rollers 40 and 41 have center points 40a and 41a, respectively, which are joined by the dotted line, and center plate 42 has a top portion 42a generally touching the dotted line. It has been found that a preferred embodiment is where the receiving end of the top edge portion 32b of FIGURE 3 is somewhat above the nip line, while discharge end of the top edge portion 32c is somewhat below the nip line, thus providing for a decreasing slope in the top edge portion of the center plate 30. Referring back to FIGURE 3, it will be noted that the upwardly extending member or center plate 30 is of a generally planar or rectangular shape having planar side surfaces converging to form a tapered top portion 32a which has a low point 32c and a high point 32b. The center plate 30 has a width 33 which is such as to be in relatively close running relationship with the nip formed by the processing rollers. In a preferred embodiment, the center plate 30 has a width 33 in the range of 0.0625 to 0.250 inch and is preferably 0.125 inch.

As shown, center plate 30 has an appendage 31 extending above and beyond the boundaries of the center plate. The width of the appendage 31 must be at least equal to the maximum horizontal stroke of the cycle described at FIGURE 2. It has been noticed that it is essential to have a channel closure at all times at the receiving end of the processing rollers. This prevents any marine life from sliding off, or being lost or damaged by the ends of the rollers. The appendage 31 extends upwardly in the aperture of the receiving chute and its leading edge is generally even with the vertical portion of the receiving chute at the beginning of the undulating cycle, which the center plate is driven through. As the center plate moves upwardly in the cycle, appendage 31, being attached to the center plate, comes out of the receiving chute aperture and acts as an impeller or pusher against the marine life immediately next to the vertical portion of the receiving chute and on the edge of the downwardly sloping portion. The appendage 31 acting through the slotted receiver chute serves as an end closure and additionally acts as a feeder for marine life on the receiving chute and also tends to give an impetus to marine life at the receiving end of the channel between the processing rollers. In the preferred embodiment of the invention appendage 31 has a width 34 in the range of 0.5 to 3 inches which extends beyond the end of the processing rollers, and a height 35, above the high point 32b of the center plate 30, in the range of 1.5 to 4 inches; preferably the width 34 of the appendage 31 is 1.5 inches and the height 35 is 3 inches.

As shown in FIGURE 5, a suitably rigid frame 50 is provided for generally supporting and mounting the operational elements of the processing machine. Sloping guide members 51 are provided to direct the marine life into the nips of the processing rollers 52 and 52'. Positioned above the cleaning nips of the respective rollers are spray heads 57 which supply water to enhance frictional properties of the marine life for cleaning and aiding in washing trash downwardly. The trash is pulled downward between the operating surfaces of the rollers 52 and 52', and the center plate 54, to fall upon a suitable trash container (not shown). The processing rollers 52 and 52' are in a generally horizontal plane, spaced apart a predetermined distance to form a nip. In the substantial center of the nip, and leaving some clearance between the peripheral surface of the rollers 52 and 52' and itself, is a center plate 54 having a top portion 54a which generally tapers to form a wedge-like top portion. The downwardly sloping surfaces of the rollers 52 and 52' and the top portion 54a of the center plate 54 form a W-shaped channel along which the marine life is processed. It will be noticed that the two outer processing rollers 52 are supported by back-up members 53, which take the form of small diameter rollers urged against the non-operative side of the processing rollers 52 or some other suitable support means may be provided to prevent any undue deflection along the length of the processing roller. In larger forms of marine life, the outer covering may have relatively substantial dimensions, and such outer covering must be dragged down and physically separated between the center plate 54 and the processing rollers 52 and 52', which may in certain instances cause deflection of the rollers at such working points. The two inner processing rollers 52' are also provided with a back-up member 61 mounted in the non-operative channel formed therebetween. Back-up member 61 may be a suitably rigid plate, but is preferably an aluminum plate in the general form of a T, as best seen at FIGURE 6, wherein processing roller 60 is supported and backed up by back-up member 61 having support points, or hangers 62 and a downwardly extending protrusion 63. Back-up member 61 supports the roller over a portion of its length by contacting the upper outer peripheral surface of the processing roller, and gives additional support through the downwardly extending protrusion 63 which extends to a point below the diameter of the processing roller and substantially encompasses the centroidal axis thereof. A preferred embodiment of the back-up member 61 includes an aluminum plate of approximately 0.125 inch thickness and having a protrusion which is approximately 6 inches wide. It will be realized of course, that the width of the protrusion can be varied and that a multiple of protrusions may be employed.

As shown in FIGURE 7, processing roller 70 is of tubular construction having a central shaft or axis 71 mounted for rotation in a conventional manner. Shaft 71 may be formed of any suitable material but is preferably a steel shaft having approximately a 0.75 inch diameter. Mounted on the rotational axis 71 are plastic washers 75 and 75a, which are attached to metallic thrust collars 76. The thrust collars 76 are attached to the shaft 71 by means of conventional set screws 76a, however, any other suitable means for attachment may be used. The plastic washers 75 and 75a are attached to the shell member 74 and are held in place thereon by means of suitable waterproof, non-toxic plastic cement or glue and additionally are secured by dowel pins sunk through inner shell member 74 and into the body of the plastic washers 75 and 75a to form an anchoring means between the washers 75 and 75a and the shell member 74. The washers 75 and 75a are approximately equidistance spaced along the shaft 71 to provide support to the outer shell, and as support means, any number of the washers may be used, but in the preferred embodiment, four such washers are used. Over the shaft 71, at its ends which extend beyond the body of the rollers, are mounted sleeve members 72, which are securely attached to washers 75 and 75a by suitable means, as for example, cementing. These sleeve members 72 act as a cover for the portion between the roller ends and the shaft bearing seals (not shown) and simultaneously prevent water and the like from damaging the bearing assembly while presenting a substantially waterproof non-toxic surface to the marine life, in cooperation with the other elements of the processing machine.

The processing roller 70 is provided with an elastomeric frictional outer surface 73, which may be a single shell member or, as shown, have a supporting shell member 74 contacting it on its inner surface area. The shell 73 is preferably composed of a polyvinyl chloride, or PVC, as it is referred to commercially, which may be rigid or somewhat flexible, and is preferably somewhat flexible having localized yieldable surface. Of course, it will be understood that other suitable non-toxic, waterproof resilient materials could be used to form the elastomeric outer friction surface of the processing rollers. The PVC resins are preferred as they are very durable, easily processed, low in cost, have excellent water and chemical resistance and are relatively non-toxic. Further, PVC resins are easily compounded with a wide range of plastisols to obtain any desired degree of flexibility and strength.

In a preferred embodiment the outer peripheral surface 73 of the processing roller 70 is composed of plasticized polyvinyl chloride, having a hardness in the range of 30 to 80 durometers. The elastomer surface has exceptional frictional properties which are utilized in cleansing and processing the marine life. Further, such a plasticized elastomer provides a substantially waterproof, non-toxic surface which is necessary in the handling of edible marine life. The inner shell member 74 is a PVC (polyvinyl chloride) plastic, but is preferably the rigid type and supports the outer shell 73. While many different forms of constructing the shell arrangement shown in FIGURE 6 are possible, a preferred method is extruding the flexible outer elastomeric PVC tube, with an outer diameter approximately in the range of 4.0 to 1.5 inches and preferably 2.875 inches and blowing this flexible tube over a rigid PVC tube with a suitable diameter. If desired, suitable glue or cement may also be blown over the rigid PVC tube prior to the plasticized PVC tube being blown on the rigid PVC tube, to additionally secure the tubes to each other. The final roller has an outer shell 73 of plasticized PVC with a thickness in the range of 0.0625 to 1.0 inch and is preferably 0.25 inch, backed up by a non-plasticizer (rigid PVC pipe or tube 74).

It has been found that the soft, flexible, resilient surface provided by the plastic processing rollers clean and process all size of marine life, including the very small shrimp in the range of 125 to 150 count and the relatively large shrimp up to and including shrimp as large as 15 count. A shrimp count may be generally defined as the number of a particular size of shrimp that go into making up one pound. The flexible, soft outer surface of the processing rollers, having a relatively high coefficient of friction and localized yield, admits the marine bodies into more intimate contact with the channel surfaces as defined by a set of processing rollers and a center plate. The cleaned marine meats are forced upwardly as slippage occurs when the outer covering of the marine life being cleaned has been removed; this slippage is augmented by the added water which acts as a lubricant. The localized yieldable surface of the processing rollers allows the hard heads and skins of the marine life to be drawn down to the trash level. Sardines and other like small fish that are generally included in shrimp catches are also cleaned. The fish are skinned and their entrails are squeezed out of their mouths, leaving the fish ready for cooking or other desirable processing.

Each processing roller is additionally provided with a surface pattern to increase the frictional properties of the outer peripheral surface of the rollers. FIGURES 8 and 9 show two different types of surface patterns found especially useful in the processing of marine life. In FIGURE 8, processing roller 80 is provided with relatively fine helically spiralling grooves and ridges 82, over the entire length of the roll. Superimposed thereon is another set of helical grooves and ridges 81 which are relatively more distinct than the first set of grooves and ridges 82. The second set of grooves and ridges 81 extend from the receiving end of the roller to approximately 25% to 50% of the length of the roller. It is during this first portion of the roller that the outer covering of the marine life tends to be removed. Each roller is provided with either right or left handed helically spiralling grooves and ridges, and a set of processing rollers have one roller with a right handed spiral and the other roller with a left handed spiral. This unique configuration tends to act as a conveying mechanism for the marine life in the channel formed by two such opposing spiral surfaced rollers, and additionally in cooperation with the center plate, tends to message and knead the marine life in the nip. It is to be noted that in certain instances only one of a pair of rollers need be provided with frictional surface patterns.

FIGURE 9 shows another embodiment of the invention utilizing a surface pattern for a processing roller which is somewhat different than that described in FIGURE 8. Processing roller 90 is provided with relatively fine helically spiralling grooves and ridges 91 over the entire length of the roller. Superimposed thereon are two distinct sets of slits, or cuts 92 and 93, which are generally normally parallel to the axis of the roller and extend from opposite ends of the roller toward each other. The first set of slits or cuts 92 are substantially 60° to 90° apart on the outer periphery of the roller and preferably begin at the receiving end of the processing roller 90. FIGURE 10 shows the receiving end of a processing roller 100 having an outer peripheral shell member 101 wherein slits or cuts 102 are spaced approximately 90° apart.

Referring back to FIGURE 9, it will be noted that a second set of cuts of slits 93 are also provided for a processing roller 90. The slits 93 are substantially 120° to 180° apart and preferably begin at the discharge end of the processing roller and extend toward the center thereof, terminating in close proximity to the first set of slits 92. Both sets of slits 92 and 93 extend substantially 25% to 60% of the entire length of the processing roller, and are relatively more distinct than the underlying spiralling grooves and ridges. FIGURE 11 shows the discharge end of a processing roller 110 having an outer peripheral shell member 112 wherein slits or cuts 111 are spaced approximately 180° apart. The surface pattern provided by the fine helically spiralling grooves and ridges with either a superimposed second set of more distinct grooves and ridges or one or more sets of superimposed slits or cuts materially aids in the processing of the marine life in the nip. The edges of the surface patterns thus provided on the outer peripheral area of the rollers more readily engage the frictional surfaces of the marine life and in conjunction with the movement of the center plate and the rotation of the rollers easily remove the appendages, outer coverings, etc. of the marine life. It has also been found that a processing roller having the surface pattern described can completely clean and remove the contents of the veins and other objectionable matter from all sizes of shrimp, sardines and like marine life in one pass. In the preferred embodiment, the processing rollers comprise a tubular non-toxic solid elastomer having a length in the range of 48 to 96 inches, with a diameter in the range of 1.5 to 4.0 inches, and more preferably the processing rollers have a 2.875 inch outer diameter and are 67.375 inches in length. Thus, in the preferred embodiment of the invention, the processing rollers are provided with an outer shell composed of a flexible solid elastomer having a frictional surface pattern thereon and the processing rollers are of such dimensions as to allow all sizes of shrimp, sardines and like marine life to be cleansed, deveined, etc. in one pass along the length of the rollers.

Referring now to FIGURES 12 and 13, a graph plotting vertical and horizontal distances, respectively, against time, for the undulating cycle of the center plate is shown. The cycle of motion can be regulated either in a horizontal stroke or a vertical stroke, independently by an appropriately designed drive mechanism. In the preferred embodiment of the processing machine, the vertical stroke, as shown in FIGURE 12, is regulated so as to be in the range of 1 to 3 inches, and is preferably 2 inches. The horizontal stroke, shown in FIGURE 13, is regulated so as to be in the range of 0.25 to 1.5 inches, and is preferably 0.875 inch. A suitable timing motor for the cam operated cycling switches having variable gears allows a wide choice of ranges of time in which to complete the cycle of the plate motion. In the preferred embodiment of the invention, the cycle is completed in 1.125 to 4.5 seconds, and preferably the cycle is completed in 2.25 seconds. As shown in the graph in FIGURE 12, the point O is the starting point for the center plate and at this point the center plate top portion is partially above, and partially parallel with the plane containing the center axes of the processing rollers. Point X shows the maximum vertical stroke of the center plate; this stroke tends to cause the marine life in the nip to change its relative position in the processing channel so as to present a different surface portion to contact the center plate and processing rollers and also this vertical stroke tends to push or impel the marine life toward the discharge end of the processing rollers. Point Y shows the minimum vertical stroke of the center plate and tends to apply peeling and squeezing pressure to the marine life in the nip in conjunction with the frictional peripheral surfaces of the processing rollers. FIGURE 13 shows similar relative positions of the center plate during its horizontal cycle. Point X shows the maximum horizontal stroke, point Y shows the minimum horizontal stroke. It will be noticed that time required for the vertical stroke to reach its maximum point is approximately one half the amount of time required for the horizontal stroke to reach its maximum point.

As the top portion of the center plate near the receiving end of the processing rollers is above the nip line, it tends to carry or drag backwards, against the frictional surfaces of the processing rollers as provided by the spiralling grooves, ridges and slits and thereby causing a massaging and kneading of the marine life in the nip and subjecting it to additional frictional forces which aid in the cleansing and processing of the marine life.

FIGURE 14 shows another form of construction for the center plate 140. It will be noted that the overall configuration is quite similar to the embodiment of the center plate shown at FIGURE 3. The notable difference being that the top portion 141 of the plate is first cut at an angle so as to be downwardly sloping toward the discharge end and is then formed into a wedge-like edge 142. In other words, lines *a* and *b* which are parellel to each other are at an oblique angle to line *c* of the center plate. This form of construction is somewhat more economical and more simple to form.

In summary, it will be seen that there is provided an improved shrimp, sardine and like marine life processing machine which is capable, because of its unique features, not only of removing the outer shell and appendages of the desired marine life, but additionally removing entrails, sand, grit, vein contents, etc. which are generally found in the interior of the marine life and are preferably removed as they are not edibly wholesome. The processing machine has a unique center plate with a tapered top portion or edge which has a decreasing slope, being higher at the receiving end and gradually decreasing to the discharge end. This decreasing slope of the top portion of the center plate provides unique massaging action to the marine life when the center plate is driven through its undulating cycle. The center plate also has a unique appendage attached to its receiving end, which forms a closure with the receiving chute and aids in presenting a continuous channel for the marine life to be processed, in cooperatin with the receiving chute and the operating peripheral scored surfaces of the processing rollers. The processing rollers are provided with a waterproof, non-toxic solid elastomeric outer shell having a localized yieldable surface and enhanced frictional properties, which are augmented by either transverse or longitudinal (to the axes of the rollers) scoring provided thereon, which not only provides additional contact areas or edges to materially assist in the processing of the marine life but aids in propelling the marine life down the length of the rollers to the discharge end thereof.

It will be understood that modifications and variations may be effected without departing from the spirit and scope of the novel concepts of the present invention.

We claim as our invention:

1. In a machine for processing shrimp, sardines and like marine life, the combination comprising: a pair of relatively rotatable processing rollers having receiving ends and discharge ends, said rollers being in a generally horizontal plane and spaced apart a predetermined distance to form a nip, each of said rollers having a frictional surface, means for rotating said rollers relative to one another, an upwardly extending member in the substantial center of the nip having a top portion with a decreasing slope extending from one end of the rollers, said member having an appendage attached to one end thereof, a drive means connected to said member moving the member through a triangular-like cycle, first downwardly and forwardly to apply peeling and squeezing pressure to the marine life in the nip, next horizontally backwardly massaging the marine life and then upwardly and forwardly moving the marine life forwardly in the nip.

2. A machine for processing shrimp, sardines and like marine life according to claim 1 wherein the top portion with the decreasing slope of the upwardly extending member is generally tapered to form an edge, said edge contacting the marine life in the nip.

3. A machine for processing shrimp, sardines and like marine life according to claim 2 wherein the top portion with the decreasing slope of the upwardly extending member has its uppermost point at the receiving end of the processing rollers and the appendage is attached to said member at its uppermost point.

4. A machine for processing shrimp, sardines and like marine life according to claim 1 wherein the frictional surfaces of the processing rollers are composed of a solid elastomer.

5. A machine for processing shrimp, sardines and like marine life according to claim 4 wherein the elastomer has a hardness in the range of 30 to 80 durometers.

6. A machine for processing shrimp, sardines and like marine life according to claim 1 wherein each of the processing rollers has a surface provided with generally circumferentially aligned spiralling grooves and ridges, said grooves and ridges of one roll being in generally opposing relationship to the grooves and ridges of the other roll.

7. A machine for processing shrimp, sardines and like marine life according to claim 6 wherein each of the processing rollers is provided with two distinct sets of grooves and ridges, one set of grooves and ridges extending the entire length of the roll and other set of grooves and ridges superimposed on the first set of grooves and ridges and extending 25 to 50% of the length of said rollers, said superimposed set of grooves and ridges originating at the receiving end of the processing rollers and being relatively more distinct than the first set of grooves and ridges.

8. A machine for processing shrimp, sardines and like marine life according to claim 6 wherein each of the processing rollers is provided with a set of spiralling grooves and ridges over the entire surface portion of said rollers and superimposed thereon are two sets of slits generally normal to the axis of the rollers and extending from opposite ends of said rollers, one set of slits being substantially 60° to 90° apart, the other set of slits being substantially 120° to 180° apart, both sets of slits extending 25 to 60% of the length of the rollers.

9. A machine for processing shrimp, sardines and like marine life according to claim 1 wherein the appendage attached to the receiving end of the upwardly extending member extends above and beyond the ends of the processing rollers.

10. A machine for processing shrimp, sardines and like marine life according to claim 9 wherein the extension of the appendage beyond the receiving end of the processing rollers is at least equal to the horizontal movement of the upwardly extending member.

11. A machine for processing shrimp, sardines and like marine life according to claim 9 wherein the extension of the appendage above the horizontal plane of the nip formed by the processing rollers is at least equal to the downward movement of the upwardly extending member.

12. A machine for processing shrimp, sardines and like marine life according to claim 1 including a receiver chute at the receiving ends of the processing rollers forming a generally continuous surface with said ends of the rollers, said receiving chute being in working relationship with the appendage of the upwardly extending member and with the peripheral surface of the processing rollers to form a continuous channel directing marine life to the discharge end of the processing rollers.

13. A machine for processing shrimp, sardines and like marine life according to claim 12 wherein the appendage of the upwardly extending member is positioned to contact marine life at the receiver chute to move said marine life forwardly along the processing roller surfaces on the upward forward stroke and on the horizontally backward stroke massages out inedible matter from the marine life.

14. A machine for processing shrimp, sardines and like marine life according to claim 1 including a receiving chute at the receiving end of the processing rollers directing marine life into that portion of the nip formed by said receiving ends of said rollers, said chute forming an incoming angle to a cross-machine plane extending downwardly to a plane parallel with the upper peripheral surface portion of the rollers and thereafter continuing in a direction generally perpendicular to said ends of the rollers, said chute having an aperture receiving the appendage attached to the upwardly extending member, whereby a working relationship between the chute, the appendage, and the processing rollers forms a continuous channel directing marine life to a discharge end of the processing rollers.

15. A machine for processing shrimp, sardines and like marine life according to claim 1 wherein the processing rollers are supported on one side thereof by back-up members, thereby preventing deflection of the rotational axis of the processing rollers.

16. A machine for processing shrimp, sardines and like marine life according to claim 1 wherein all the surfaces contacting the marine life are waterproof and non-toxic.

17. A machine for processing shrimp, sardines and like marine life according to claim 1 wherein the processing rollers comprise a tubular non-toxic solid elastomer having a localized yieldable surface and a length in the range of 48 to 96 inches with an outer diameter in the range of 1.5 to 4 inches, a plurality of plastic non-toxic washers mounted at predetermined locations inside said tubular elastomer, a plurality of metallic thrust collars attached to said plastic washers, a metallic shaft mounted inside said thrust collars and protruding beyond the ends of said tubular elastomer, said shaft being mounted for rotation, and non-toxic sleeve members fitting over the protruding ends of the metallic shaft whereby the marine life at the nip contacts a continuously waterproof and non-toxic surface area.

18. A machine for processing shrimp, sardines and like marine life, according to claim 1 wherein at least one of the processing rollers has a surface provided with generally circumferentially aligned spiralling grooves and ridges.

19. A machine for cleaning shrimp, sardines and like marine life comprising a pair of parallel roller members spaced apart a distance to define a gap therebetween, said rollers having at least one inwardly and downwardly inclined sloping surface provided with transverse scoring, a center plate in said gap having vertical side surfaces facing the sloping surface, and means for moving the center plate vertically relative to the roller members for frictionally removing unedible portions from the marine life therebetween.

20. A machine for processing shrimp, sardines and like marine life according to claim 19 wherein the inwardly and downwardly inclined sloping surface is provided with longitudinal scoring.

21. A machine for processing shrimp, sardines and like marine life according to claim 19 wherein the inwardly and downwardly inclined sloping surface is provided with transverse scoring, and longitudinal scoring in superimposed relationship.

22. A machine for processing shrimp, sardines and like marine life according to claim 19 wherein the center plate has an appendage attached to one end, said appendage extending above and beyond the ends of the roller members.

23. A machine for processing shrimp, sardines and like marine life according to claim 19 wherein at least one of the pair of parallel roller members is provided with a solid elastomer outer surface having locally resilient working areas.

24. In a machine for processing shrimp, sardines and like marine life, the combination comprising: a pair of relatively rotatable processing rollers having receiving ends and discharge ends, said rollers having their axes in a common plane and having peripheral surfaces spaced apart a predetermined distance to define a nip, each of said rollers having locally resilient frictional surfaces, means for rotating the rollers relative to one another, a planar member extending in a second plane at an angle to the aforesaid common plane and in the substantial center of the nip, said member having a working top face sloping generally at an angle to said nip, a generally coplanar abutment at one end of such working face, and drive means for impelling said member through a cycle in said second plane, in a first direction forwardly and toward the nip for applying peeling pressure to such marine life in the nip, next backwardly along the nip for a kneading or massaging movement relative to such marine life in the nip, and then forwardly and away from the nip for propelling such marine life forwardly in the nip.

References Cited

UNITED STATES PATENTS

| | | | |
|---|---|---|---|
| 3,080,605 | 3/1963 | Welcker et al. | 17—2 |
| 3,143,761 | 8/1964 | Welcker et al. | 17—2 |
| 2,537,355 | 1/1951 | Lapeyre et al. | 17—2 |
| 2,778,055 | 1/1957 | Lapeyre et al. | 17—2 |
| 2,832,092 | 4/1958 | Lapeyre et al. | 17—2 |
| 2,886,844 | 5/1959 | Lapeyre et al. | 17—2 |
| 2,976,564 | 3/1961 | Skrmetta | 17—2 |
| 2,988,771 | 6/1961 | Lapeyre et al. | 17—2 |
| 3,018,510 | 1/1962 | Lapeyre et al. | 17—2 |
| 3,070,832 | 1/1963 | Lapeyre | 17—2 |
| 3,070,833 | 1/1963 | Skrmetta | 17—45 |
| 3,143,763 | 8/1964 | Welcker et al. | 17—45 |

LUCIE H. LAUDENSLAGER, *Primary Examiner.*